UNITED STATES PATENT OFFICE.

ZENO OSTENBERG, OF SAN JOSE, CALIFORNIA.

PRODUCT DERIVED FROM VEGETABLE PROTEINS.

1,316,854.　　　　Specification of Letters Patent.　　Patented Sept. 23, 1919.

No Drawing.　　Application filed February 12, 1917. Serial No. 148,043.

*To all whom it may concern:*

Be it known that I, ZENO OSTENBERG, a citizen of the United States, and resident of San Jose, in the county of Santa Clara and State of California, have invented a certain new and useful Product Derived from Vegetable Proteins, of which the following is a specification.

The substances known as gliadin and zein have long been recognized as important constituents of the gluten of certain cereals as wheat, rye and corn, respectively, and have been extracted in the form of glutinous masses.

Those portions of vegetable proteins above referred to, or in broad terms, the prolamins of vegetable proteins, are insoluble in water and are insoluble in pure alcohol, but they may be dissolved in a suitable mixture of alcohol and water within a range of about 60% to 80% of alcohol to form thick viscous solutions. They are insoluble in solutions of salts but are soluble in dilute acid or alkali.

When these substances, that is the so called prolamins, are dissolved in suitable solvents, as 70% ethyl alcohol, or in dilute acid or alkali, they form thick viscous solutions which I have found may be treated in such a manner that they may be used in the manufacture of filaments (artificial silk), films, sheets, foil, lacquer, cements, binders for various materials, paint vehicles, paper size, artificial ivory, onyx, horn, etc.

These various manufactures may be formed or shaped from the viscous solution by means of any of the well known mechanical processes and the formed substance solidified simply by drying, by coagulating in suitable solutions of salts or other electrolytes, solutions of colloids, various liquids in which gliadin or zein are not soluble, such as acetone, strong alcohols, etc., or by heating above 60 C., preferably at 100 C., by pure water or pure alcohol, but without the treatment hereinafter described the prolamins form hard, brittle masses when dry, which become sticky and expanded and distorted when wet, and are therefore useless for the purposes above outlined.

I have found that they may be rendered less brittle, that is, tough and flexible by means of small amounts of various substances such as fats, waxes, resins, oils, soaps, sulfonated fats or oils, sugars, and the higher polyatomic alcohols, such as glycerol, sugars of the mono-, di-, and poly-saccharid groups, phenolic substances such as phenols, naphthols, etc., terpemes and related compounds, such as camphor, borneol, turpentine oils, etc. Some of these various substances may be added directly to the solution, especially in the manufacture of artificial silk and films of various kinds, or, in some cases the articles may be impregnated with the toughening agent after formation. The product may be rendered very resistant to water by means of formaldehyde or other aldehydes or by means of heat or both.

The filaments made from gliadin and zein solutions (either alone or when both solutions are combined) resemble the genuine silk produced by the silk-worm more closely than any other artificial silk, both in physical and chemical properties, and also in appearance, being strong, clear and brilliant.

The forms such as filaments and films are easily bleached after being formed or the bleaching agent may be added before coagulation. The solution may be easily clarified by centrifugalization or filtration or both. The materials thus obtained are non-inflammable; upon ignition they merely puff up and char.

Having thus described my invention, what I claim as new and desire to secure by Letters Patent, is:—

1. A non-thermoplastic mixture of a vegetable prolamin and a toughening agent.

2. A non-thermoplastic mixture of a vegetable prolamin and a toughening agent, rendered insoluble.

3. A non-thermoplastic mixture of a vegetable prolamin and a toughening agent, rendered insoluble by the addition of an aldehyde.

4. A non-thermoplastic mixture of a vegetable prolamin and a toughening agent, rendered insoluble by the addition of an aldehyde and the application of heat.

5. A non-thermoplastic mixture of that portion of plant proteins that is soluble in 70% alcohol, and a toughening agent.

6. A non-thermoplastic mixture of that portion of vegetable proteins that is soluble in 70% alcohol and a toughening agent, and rendered insoluble.

7. A non-thermoplastic mixture of that portion of vegetable proteins that is soluble in 70% alcohol and a toughening agent, rendered insoluble by the addition of an aldehyde.

8. A non-thermoplastic mixture of that portion of vegetable proteins that is soluble in 70% alcohol and a toughening agent, rendered insoluble by the addition of an aldehyde and the application of heat.

9. A non-thermoplastic mixture of gliadin and a toughening agent.

10. A non-thermoplastic mixture of gliadin and a toughening agent, rendered insoluble.

11. A non-thermoplastic mixture of gliadin and a toughening agent, rendered insoluble by the addition of an aldehyde.

12. A non-thermoplastic mixture of gliadin and a toughening agent, rendered insoluble by the addition of an aldehyde and the application of heat.

13. A non-thermoplastic mixture of a vegetable prolamin, and a toughening agent, solidified by heat and rendered insoluble.

14. A non-thermoplastic mixture of a vegetable prolamin and a toughening agent, solidified and rendered insoluble.

15. A non-thermoplastic mixture of a vegetable prolamin and a toughening agent, solidified.

16. A non-thermoplastic mixture of a vegetable prolamin and a toughening agent, solidified and rendered insoluble by treatment with an aldehyde.

17. A mixture of a vegetable prolamin and a sulfonated oil.

18. A mixture of a vegetable prolamin and a sulfonated oil, rendered insoluble.

19. A non-thermoplastic mixture of a vegetable prolamin and a toughening agent, solidified by heat.

20. Products formed from vegetable prolamins in solution and subjected to the action of a toughening agent.

21. Products formed from vegetable prolamins in solution and subjected to the action of a toughening agent and rendered resistant to water.

In testimony whereof I have hereunto affixed my signature this 3rd day of February, 1917.

ZENO OSTENBERG.

It is hereby certified that in Letters Patent No. 1,316,854, granted September 23, 1919, upon the application of Zeno Ostenberg, of San Jose, California, for an improvement in "Products Derived from Vegetable Proteins," an error appears in the printed specification requiring correction as follows: Page 1, line 59, for the word "terpemes" read *terpenes;* and that the said Letters Patent should be read with this correction therein that the same may conform to the record of the case in the Patent Office.

Signed and sealed this 3d day of February, A. D., 1920.

[SEAL.]

M. H. COULSTON,
*Acting Commissioner of Patents.*

Cl. 106—38.